(12) United States Patent
Chandrasekaran

(10) Patent No.: US 10,503,568 B2
(45) Date of Patent: Dec. 10, 2019

(54) ASYNCHRONOUS HANDLING OF SERVICE REQUESTS

(71) Applicant: Oracle International Corporation, Redwood Shores, CA (US)

(72) Inventor: Yuvaraj Chandrasekaran, Union City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/993,031

(22) Filed: May 30, 2018

(65) Prior Publication Data

US 2019/0095258 A1    Mar. 28, 2019

Related U.S. Application Data

(60) Provisional application No. 62/563,754, filed on Sep. 27, 2017.

(51) Int. Cl.
*G06F 9/54*    (2006.01)

(52) U.S. Cl.
CPC .............. *G06F 9/542* (2013.01); *G06F 9/546* (2013.01); *G06F 9/547* (2013.01); *G06F 2209/543* (2013.01); *G06F 2209/544* (2013.01)

(58) Field of Classification Search
CPC ................................. G06F 9/542; G06F 9/546
USPC ................................................... 719/313, 318
See application file for complete search history.

(56) References Cited

U.S. PATENT DOCUMENTS

| | | | |
|---|---|---|---|
| 8,271,602 B2 * | 9/2012 | Jin | G06Q 30/06 370/260 |
| 8,990,286 B2 * | 3/2015 | Jansson | G06F 16/958 709/202 |
| 9,231,995 B2 * | 1/2016 | Junnarkar | H04L 67/26 |

* cited by examiner

*Primary Examiner* — Andy Ho
(74) *Attorney, Agent, or Firm* — Invoke

(57) ABSTRACT

Techniques for asynchronous handling of service requests are disclosed. A service receives a request from a requesting entity. The request includes a function identifier and function input. Responsive to receiving the message, the service selects a first event handler to process the request. The service translates, via the first event handler, the function identifier to a native function call. The service initiates execution of the native function call using the function input, and receives output corresponding to the execution of the native function call. Responsive to receiving the output, the service selects a second event handler to process the output. The service generates, at least in part by the second event handler, a response based on the output. The service transmits the response to the requesting entity.

20 Claims, 4 Drawing Sheets

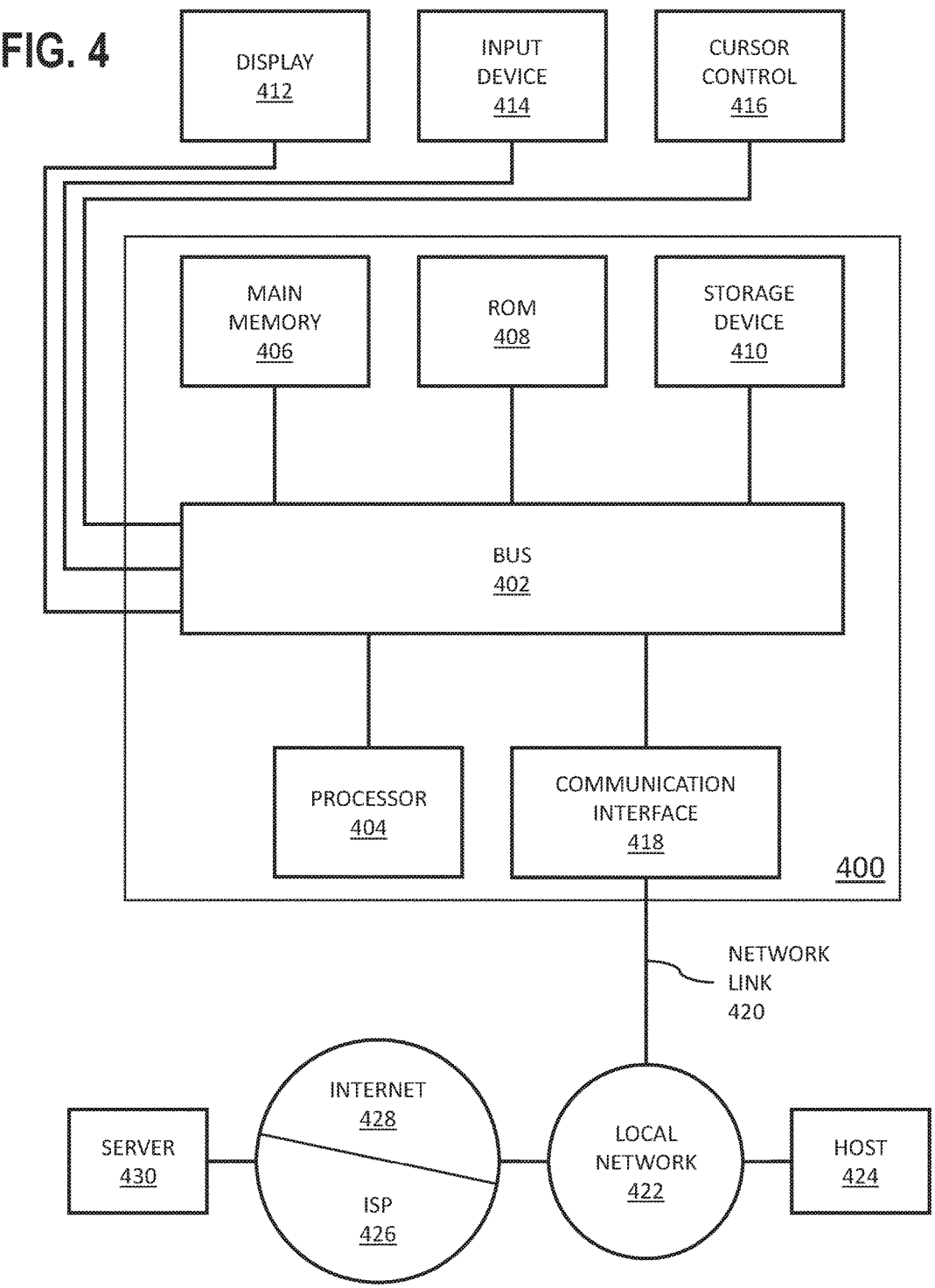

ASYNCHRONOUS HANDLING OF SERVICE REQUESTS

BENEFIT CLAIMS; RELATED APPLICATIONS; INCORPORATION BY REFERENCE

This application claims the benefit of U.S. Provisional Patent Application 62/563,754, filed Sep. 27, 2017, which is hereby incorporated by reference.

The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to service requests. In particular, the present disclosure relates to handling service requests.

BACKGROUND

A service is a set of code that exposes an application programming interface (API). Another set of code transmits a request to the API, to perform one or more operations indicated by the request. The set of code that transmits the request may be referred to by many names, such as user, consumer, requesting entity, etc. As one example, a web service exposes an API for requesting web pages. A web browser (the requesting entity in this example) transmits a request to the API over the Internet. In response to the request, the web service transmits a web page (e.g., hypertext markup language (HTML)) to the web browser.

Many services operate according to a synchronous model. In a synchronous model, the requesting entity maintains a persistent connection to the service for the duration of the request-response cycle. To process the request, the service may also maintain at least one thread that persists through the duration of the request-response cycle. In the web service example above, a single thread may execute code that receives the request, retrieves the appropriate HTML from a server, and transmits the HTML to the web browser.

Synchronous service models may have various performance concerns. For example, if a requesting entity is forced to maintain a persistent connection with the service throughout the request-response cycle, the requesting entity may effectively be precluded from performing other operations while waiting for the response. As another example, if the service maintains a thread that persists through the duration of the request-response cycle, that thread may consume processing cycles unnecessarily, degrading the web service's performance. Alternatively or in addition, the persistent thread may present a single point of failure, where if the thread fails, the entire request-response cycle fails.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 4 shows a block diagram that illustrates a computer system in accordance with one or more embodiments.

DETAILED DESCRIPTION

Figure 1:
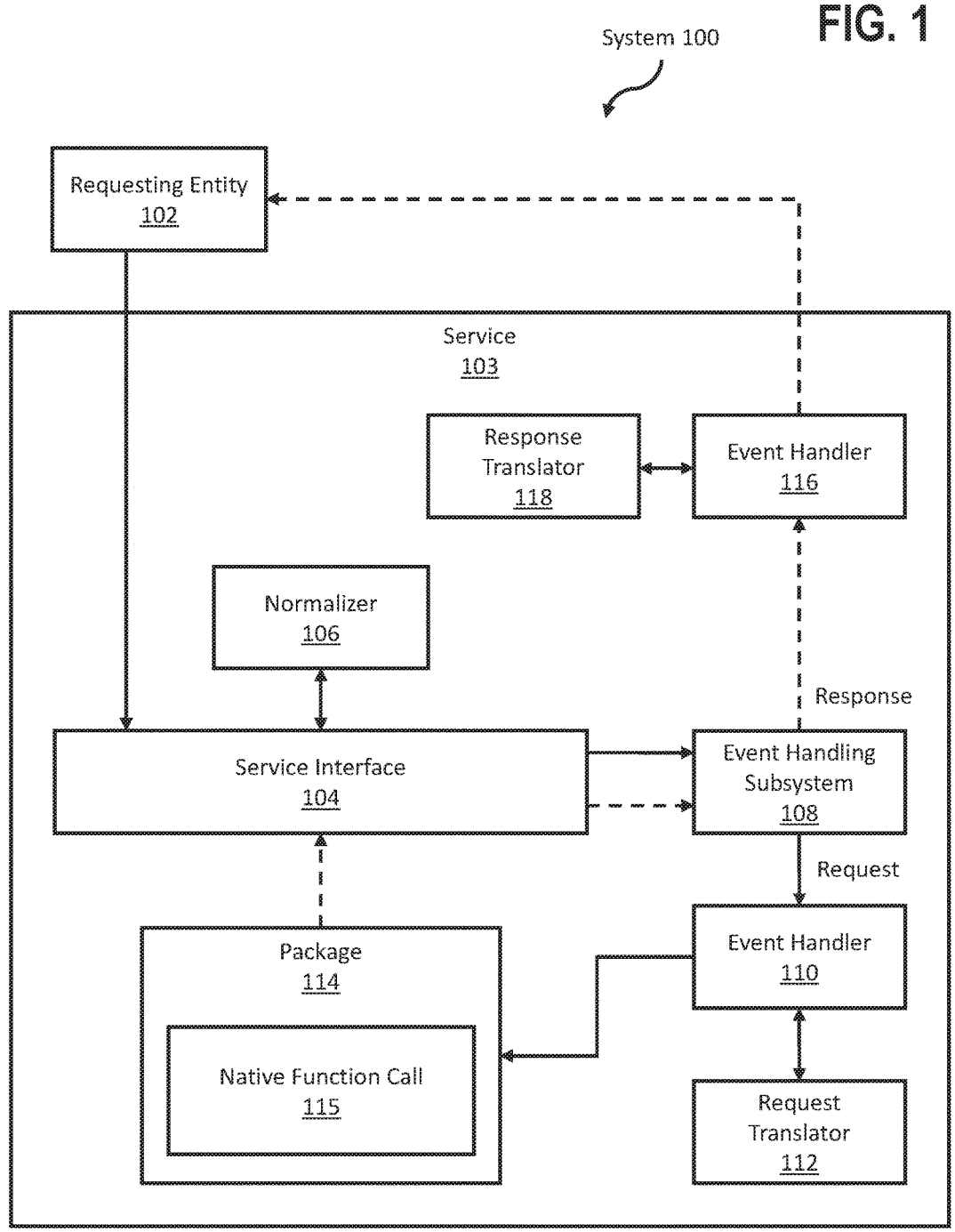
FIG. 1 is a block diagram illustrating a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
3. ASYNCHRONOUS HANDLING OF SERVICE REQUESTS
4. ILLUSTRATIVE EXAMPLES
5. MISCELLANEOUS; EXTENSIONS
6. HARDWARE OVERVIEW
7. COMPUTER NETWORKS AND CLOUD NETWORKS
8. MICROSERVICE APPLICATIONS

1. General Overview

One or more embodiments include techniques for asynchronous handling of service requests. In an embodiment, asynchronous handling of service requests helps avoid one or more performance issues often associated with synchronous service models. For example, asynchronous handling of service requests may help: (a) avoid a performance impact associated with maintaining a persistent connection between the requesting entity and the service throughout the request-response cycle; (b) avoid a performance impact associated with the service maintaining a persistent thread throughout the request-response cycle; and/or (c) reduce the risk of the request-response cycle failing due to a single thread's failure.

In an embodiment, a service receives a request from a requesting entity. The request includes a function identifier and function input. Responsive to receiving the message, the service selects a first event handler, of a plurality of event handlers, to process the request. The service translates, via the first event handler, the function identifier to a native function call. The service initiates execution of the native function call using the function input. The service receives output corresponding to the execution of the native function call. Responsive to receiving the output corresponding to the execution of the native function call, the service selects a second event handler, of the plurality of event handlers, to process the output. The service generates, at least in part by the second event handler, a response based on the output. The service transmits the response to the requesting entity.

In an embodiment, the service's selection of the second event handler to process the output is independent of the service's selection of the first event handler to process the request. Specifically, the service's selection of the event handler to process the output may be independent of which event handler was selected to process the request. The first event handler may not handle the output corresponding to the native function call. The service may terminate the first event handler prior to receiving the output corresponding to the execution of the native function call.

One or more embodiments described in this Specification and/or recited in the claims may not be included in this General Overview section.

2. Architectural Overview

FIG. 1 illustrates a system 100 in accordance with one or more embodiments. As illustrated in FIG. 1, system 100 includes a requesting entity 102 and a service 103. The service 103 has various components also illustrated in FIG. 1. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below.

In an embodiment, a requesting entity 102 refers to hardware and/or software configured to perform operations described herein for transmitting a request to a service 103 and receiving a response from the service 103. Specifically, the requesting entity 102 transmits a request that includes (a) a function identifier corresponding to a particular function of the service 103 (e.g., native function call 115) and (b) function input to be supplied to that function. The request may also identify a package 114 to which the native function call 115 belongs.

In an embodiment, a service 103 refers to hardware and/or software configured to handle service requests (e.g., a request received from a requesting entity 102) asynchronously. Examples of operations for handling service requests asynchronously are described below. Specifically, a service interface (104) may receive the request. The service interface 104 exposes an API for receiving service requests. The service interface 104 may expose the API to one or more requesting entities (e.g. requesting entity 102). For example, the service interface 104 may expose an API for receiving requests structured as JavaScript Object Notation (JSON), Simple Object Access Protocol (SOAP), binary instructions, a procedural language extension to Structured Query Language (PL/SQL), Java function calls, mainframe commands, and/or any other type of API request.

In an embodiment, the service interface 104 also exposes an interface for receiving requests issued by one or more other components of the service 103. Specifically, the service interface 104 may expose an API for receiving output corresponding to native function calls (e.g., native function call 115) that are executed as part of the service 103. The API exposed to the requesting entity 102 and the native function call 115 may be similar or identical.

In an embodiment, the service 103 includes a normalizer 106. The normalizer 106 includes code to convert requests to a normalized message format. Specifically, the normalized message format may be a particular format that is supported by an event handling subsystem 108, described in further detail below. For example, the normalized message format may correspond to a Universal Message Structure (UMS) format that includes a header layer (transaction identifier, date, checksum, etc.), security layer (user authentication, certificates, etc.), system layer (calling system, source system configuration, software version, bit compatibility, Unicode character format, etc.), service layer (target system, service to be called, callback URL, response compatibility, response format, etc.), and message content in extensible markup language (XML) or another format. The service interface 104 may be configured to receive requests from both outside the service 103 (e.g., from requesting entity 102) and inside the service 103 (e.g., from native function call 115) and use the normalizer 106 to convert each request to the normalized message format, regardless of the source of the request.

In an embodiment, the service interface 104 transmits the request (which may have been normalized) to an event handling subsystem 108. The event handling subsystem 108 is configured to select event handlers for processing messages received via the service interface 104. Specifically, the event handling subsystem 108 may select an event handler 110 to process a request from a requesting entity 102 and a different event handler 116 to process output from a native function call 115. The selection of event handler 110 may be entirely independent of the selection of event handler 116. That is, which event handler 110 is selected to process a request from a requesting entity 102 may not have any bearing on which event handler 116 is selected to process output of a native function call 115. Each event handler may represent a different thread that operates independently of any other event handler(s).

In an embodiment, the event handling subsystem 108 requires that the messages it receives be in a normalized message format. For example the event handling subsystem 108 may require messages in UMS format. In an embodiment, the event handling subsystem 108 maintains a pool of event handlers (not shown) and allocates event handlers from the pool as messages are received. Alternatively, the event handling subsystem 108 may create event handlers upon request. For example, in an object-oriented environment, the event handling subsystem 108 may instantiate a different event handler for each message received.

In an embodiment, an event handler 110 is configured to process a request from a requesting entity 102. Specifically, the event handler 110 is configured to initiate execution of a native function call 115. Prior to initiating execution of the native function call 115, the event handler 110 may use a request translator 112 to translate a function identifier, included in the request from the requesting entity 102, to the native function call 115. If the request also identifies a package 114 to which the native function call 115 belongs, the translation may also be based on package identifier. In an embodiment, the event handler 110 initiates execution of the native function call 115 using function input included in the request from the requesting entity. The event handler 110 may then terminate without waiting for the output of the native function call 115.

In an embodiment, the native function call 115 generates output. For example, in the web service example discussed above, the native function call 115 may generate HTML. After generating the output, the native function call 115 transmits a request to the service interface 104. The request includes the output. The service interface 104 may use the normalizer 106 to convert the output to a normalized message format. The service interface 104 transmits the request (which may have been normalized), corresponding to the output of the native function call 115, to the event handling subsystem 108. The event handling subsystem 108 selects an event handler 116 to process the output. To process the output, the event handler 116 may use a response translator 118 to translate the output to a format that is supported by the requesting entity 102. For example, the output may be in XML format while the requesting entity 102 anticipates a response in HTML format.

In an embodiment, the event handler 116 transmits a response to the requesting entity 102. The event handler 116 may transmit the response to the requesting entity 102 in many different ways. As an example, the requesting entity 102 maintains a persistent (synchronous) connection with the service 103, even as the service 103 handles the request asynchronously. The event handler 116 transmits the response to the requesting entity 102 via the persistent connection. As another example, the requesting entity 102 does not maintain a persistent connection, but includes a callback URL in the request. The event handler 116 transmits the response to the callback URL, where the requesting entity 102 receives it. The response may or may not include the actual output of the native function call 115. For example, the service 103 may store the output in a particular location (not shown), such as a file server or database, where it is available for subsequent retrieval. The response transmitted by the event handler 116 to the requesting entity 102 may supply information about the location where the output is now available.

In the preceding discussion, reference is made to various components performing certain operations. It should be appreciated that when a component is said to perform an operation, the component may use other components to perform parts of that operation. For example, event handler 110 may use a request translator 112. Alternatively or in addition, one set of code may transfer operational control to another set of code. Thus, each component discussed herein should not be construed as limited to a single set of code. For example, where an event handler (e.g. event handler 110 and event handler 116) is said to perform a particular operation, multiple event handlers and/or other sets of code may be used. A particular set of code corresponding to an event handler may transfer operational control to another set of code corresponding to a different event handler. Thus, when a particular component is referred to as performing a particular operation, the operation may be thought of more generally as being performed via that particular component, which may involve using and/or transferring operational control between multiple sets of code.

In an embodiment, components illustrated in FIG. 1 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. Asynchronous Handling of Service Requests

Figure 2:
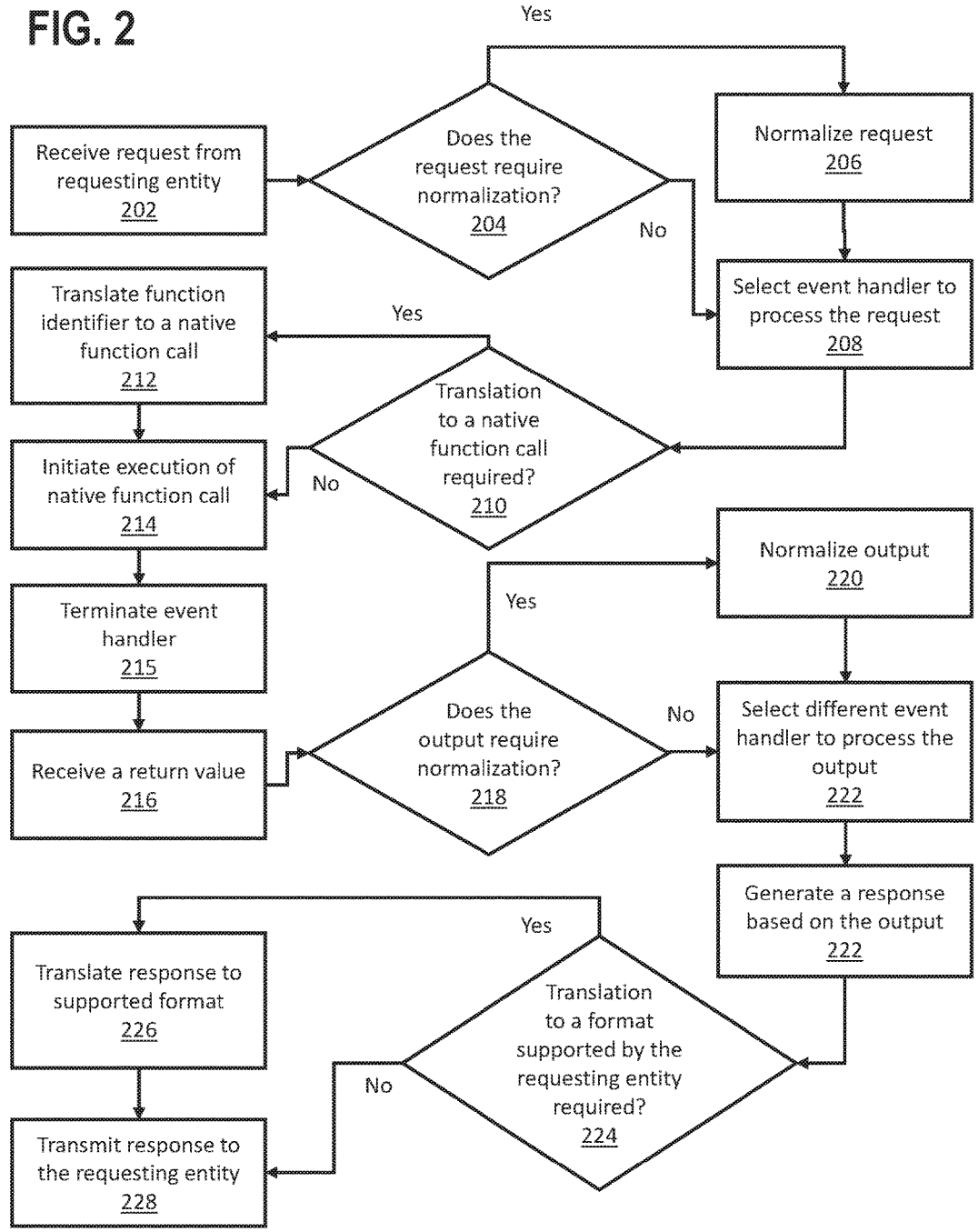
FIG. 2 illustrates a set of operations for asynchronous handling of service requests in accordance with one or more embodiments.

FIG. 2 illustrates an example set of operations for asynchronous handling of service requests in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

In an embodiment, a service receives a request from a requesting entity (Operation 202), via a service interface. The request includes a function identifier corresponding to a native function of the service and function input to supply to the native function. The request may also include a package identifier, corresponding to a package to which the native function belongs. The request may also include other types of information, such as metadata associated with the requesting entity, a session identifier, login credentials, and/or any other type of information that the service may use to process the request. As an example, the request identifies a function named "getPhoneNumber" and function input "Mike." The request may be received in many different formats.

In an embodiment, the service determines whether the request requires normalization (Operation 204). Specifically, the service may need to normalize the request (Operation 206) by converting it from a format supported by the service interface to a message format that is supported by the service's event handling subsystem. Alternatively, the service may receive a request, via the service interface, in a message format that is supported by the event handling subsystem, in which case normalization may not be required.

In an embodiment, the service selects an event handler to process the request (Operation 208). For example, the service may maintain a pool of event handlers and allocate an event handler to process the request. As another example, the service may instantiate an event handler based on receiving the request. The service may select the event handler (and/or any other event handler described herein) in many different ways. For example, if the service maintains a pool of event handlers, the event handlers may be organized in a queue structure. Selecting the event handler may involve selecting the first event handler in the queue. As another example, event handlers may be distributed across multiple processors in a cluster or some other type of system that supports load balancing. The service may select an event handler that is associated with an idle or least-utilized processor in the cluster. More generally, the service may select an event handler based on a system optimization criterion designed to reduce system bottlenecks, latency, overheating, and/or any other type of performance-related concern.

In an embodiment, the service determines whether translation to a native function call is required (Operation 210). Specifically, the service may need to translate the function identifier, supplied in the request, to a native function call (Operation 212). For example, the service may translate the function identifier to a native function call corresponding to a method call, bytecode instruction, machine code, procedural function call, or any other type of native function call that is executable by the service.

In an embodiment, the service initiates execution of the native function call (Operation 214). Initiating execution of the native function call may take many different forms, depending on the kind of native function call. In an example, the native function call corresponds to an object-oriented method call. Initiating execution of the native function call may involve calling the method. In another example, the native function call corresponds to one or more machine-level or bytecode instructions. Initiating execution of the native function call may involve instructing a system to execute the machine-level or bytecode instruction(s).

In an embodiment, the service terminates an event handler that initiated (directly and/or using one or more other sets of code) execution of the native function call (Operation 215). Because the service terminates the event handler, that particular event handler does not persist to receive output of the native function call. The output of the native system call may be processed by one or more sets of code other than the terminated event handler. Terminating an event handler during the request-response cycle is an example of asynchronous processing. Thus, the event handler (or, in an embodiment, any other event handler described herein) does not represent a single point of failure, and does not consume processing cycles unnecessarily. Alternatively or in addition, if an event handler fails, the service may be configured to roll back the request-response cycle and reattempt one or more operations using a different event handler.

In an embodiment, the service receives a return value (Operation 216). The service may receive the return value in many different ways. In an example, the native function call returns the output by calling, i.e., transmitting a message to, a service interface of the service. The service interface called by the native function call may be the same service interface that is configured to receive requests from requesting entities, as described above.

In an embodiment, the service determines whether the message received from the native function call, corresponding to the output of the native function call, requires normalization (Operation 218). Specifically, the service may need to normalize the message (Operation 220) by converting it from a format supplied by the native function call to a message format that is supported by the service's event handling subsystem. Alternatively, the service may receive the message, from the native function call, in a message format that is supported by the event handling subsystem, in which case normalization may not be required.

In an embodiment, the service selects a different event handler to process the output (Operation 222). Specifically, the event handler selected to process the output may be different from the event handler selected to process the request from the requesting entity. As noted above, the service may maintain a pool of event handlers and allocate an event handler to process the output. The pool of event handlers used here may be the same pool used to select the event handler to process the request. As another example, the service may instantiate an event handler based on receiving the output from the native function call.

In an embodiment, the service generates a response to the requesting entity, based on the output (Operation 222). Generating the response involves generating a message, based on the output of the native function call, that is responsive to the request from the requesting entity. As part of generating the response, the service may determine whether translation of the message to a format that is supported by the requesting entity is required (Operation 224). As an example, the response may initially be in XML format, while the requesting entity requires a response in HTML format. The service may translate the response to the supported format (Operation 226).

In an embodiment, the service transmits the response to the requesting entity (Operation 228). As discussed above, the response may or may not include the output of the native function call. The service may transmit the response in many different ways. For example, the service may transmit the response to a callback URL provided in the requesting entity's request. As another example, the service may transmit the response via a persistent connection between the requesting entity and the service, maintained throughout the request-response cycle.

4. Illustrative Example

A detailed example is described below for purposes of clarity. Components and/or operations described below should be understood as one specific example which may not be applicable to certain embodiments. Accordingly, components and/or operations described below should not be construed as limiting the scope of any of the claims.

Figure 3:
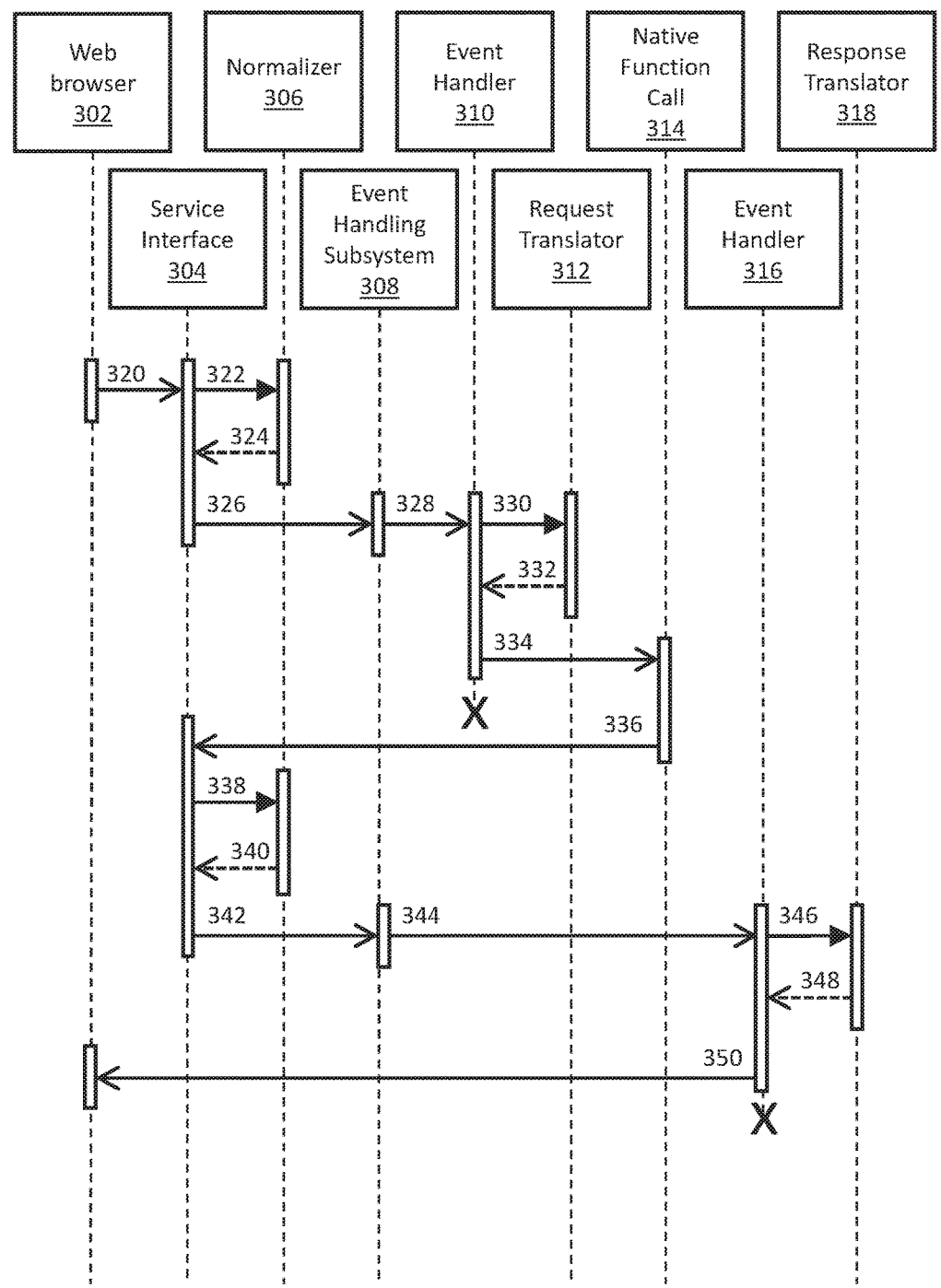
FIG. 3 is a block diagram illustrating an example in accordance with one or more embodiments.

In this example, the requesting entity is a web browser 302. All other system elements illustrated in FIG. 3 are part of the service. The web browser 302 transmits a request 320 to the service interface 302. In this example, the request 320 is for an HTML document. As indicated by the arrow having a solid line and a lined (versus solid) arrowhead, the request is asynchronous. The web browser 302 does not maintain a persistent connection with the service interface 304. As part of the request 320, the web browser 302 includes (a) function input to be supplied to a native function call 324 and (b) a callback URL.

After receiving the request 320 from the web browser 302, the service interface 304 determines that the request 320 is not in a format supported by the event handling subsystem 308 and requires normalization. The service interface 304 transmits a normalization request 322 to the normalizer 306. The normalization request 322 is a synchronous message, as indicated by the arrow having a solid line and a solid arrowhead. The service interface 304 waits for the normalizer 306 to reply with a normalized request 324. Alternatively, the normalization request 322 may be asynchronous. The service interface 304 may not wait for a reply from the normalizer 306. Instead, the normalizer 306 may transmit the normalized request 324 to the service interface 304 via an asynchronous API of the service interface 304.

The service interface 304 transmits an asynchronous handling request 326, which includes the normalized request 324, to the event handling subsystem 308. Based on the normalized request 324, the event handling subsystem 308 selects an appropriate event handler 310 to handle the normalized request 324. The event handling subsystem 308 transmits an asynchronous delegation message 328 to the event handler 310.

After receiving the delegation message 328 from the event handling subsystem 308, the event handler 310 determines that the normalized request 324 is not in a format supported by a native function call 314 and requires translation. The event handler 310 transmits a translation request 330 to the request translator 312. The translation request 330 is a synchronous message. The event handler 310 waits for the request translator 312 to reply with a translated request 332. Alternatively, the translation request 330 may be asynchronous. The event handler 310 may not wait for a reply from the request translator 312. Instead, the request translator 312 may transmit the translated request 332 to the event handler 310 via an asynchronous API of the event handler 310.

The event handler 310 makes a call 334 to the native function call 314. The call 334 includes the function input supplied by the web browser 302. After making the call 334, the event handler 310 terminates. The function input may have been normalized and/or translated during the normalization and/or translation processes described above. The native function call 314 processes the call 334 and generates output corresponding to the results of the native function call. In this example, the output is the document requested by the web browser 302. However, the native function call 314 generates the document as XML rather than HTML as requested.

After generating the output, the native function call 314 transmits a response message 336 to the service interface 304. The service interface 304 determines that the response message 336 is not in a format supported by the event handling subsystem 308 and requires normalization. The service interface 304 transmits a normalization request 338 to the normalizer 306. The normalization request 338 is a synchronous message. The service interface 304 waits for the normalizer 306 to reply with a normalized response 340. Alternatively, the normalization request 338 may be asynchronous. The service interface 304 may not wait for a reply from the normalizer 306. Instead, the normalizer 306 may transmit the normalized response 340 to the service interface 304 via an asynchronous API of the service interface 304.

The service interface 304 transmits an asynchronous handling request 342, which includes the normalized response 340, to the event handling subsystem 308. Based on the normalized response 340, the event handling subsystem 308 selects an appropriate event handler 316 to handle the normalized response 340. The event handling subsystem 308 transmits an asynchronous delegation message 344 to the event handler 316.

After receiving the delegation message 344 from the event handling subsystem 308, the event handler 310 determines that the normalized response 340 is not in a format supported by the web browser 302 and requires translation. Specifically, the normalized response 340 include the output of the native function call 314 as XML rather than HTML as requested. The event handler 316 transmits a translation request 346 to the response translator 318. The translation request 346 is a synchronous message. The event handler 316 waits for the response translator 318 to reply with a translated response 348. The translated response 348 includes the output translated from XML to HTML. Alternatively, the translation request 330 may be asynchronous. The event handler 310 may not wait for a reply from the response translator 318. Instead, the response translator 318 may transmit the translated response 348 to the event handler 316 via an asynchronous API of the event handler 316.

The event handler 316 transmits a response 350 to the web browser 302, via the callback URL supplied by the web browser 302. The response includes the HTML document requested by the web browser 302. After transmitting the response 350, the event handler 316 terminates.

In this example, except for normalization and translation requests, the entire process was asynchronous. Thus, the operations described in this example avoided the performance impact associated with maintaining a persistent connection between the web browser 302 and the service interface 304 throughout the request-response cycle. In addition, the operations described in this example avoided the performance impact associated with the service maintaining a persistent thread throughout the request-response cycle. In addition, the operations described in this example reduced the risk of the request-response cycle failing due to a single thread's failure. For example, if a thread executing the event handler 310 had failed, the event handling subsystem 308 may have detected the failure and delegated the work to a different event handler (not shown) executing in a different thread. Similarly, in a distributed or cluster environment, if the service interface 304 executing on one processor had failed, a different service interface (not shown) executing on a different processor may have continued handling service requests.

5. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

7. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

8. Microservice Applications

According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HyperText Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In one or more embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to one or more embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other micro services. Other microservices may perform responsive actions based on the above techniques, including, but not limited to, deploying additional resources, adjusting system configurations, and/or generating GUIs.

Actions

In one or more embodiments, a plugged-in microservice application may expose actions to the microservices manager. The exposed actions may receive, as input, data or an identification of a data object or location of data, that causes data to be moved into a data cloud.

In one or more embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In one or more embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause:
    receiving, from a requesting entity to a service, a request comprising a function identifier and function input;
    responsive to receiving the request: selecting a first event handler, of a plurality of event handlers, to process the request;
    translating, via the first event handler, the function identifier to a native function call;
    initiating execution of the native function call using the function input;
    receiving output corresponding to the execution of the native function call;
    responsive to receiving the output corresponding to the execution of the native function call:
        selecting a second event handler, of the plurality of event handlers, to process the output;
    generating, at least in part by the second event handler, a response based on the output; and
    transmitting the response to the requesting entity.

2. The one or more media of claim 1, wherein selection of second event handler to process the output is independent of selection of the first event handler to process the request.

3. The one or more media of claim 1, wherein selection of the event handler to process the output is independent of which event handler was selected to process the request.

4. The one or more media of claim 1, wherein the first event handler does not handle the output corresponding to the native function call.

5. The one or more media of claim 1, further storing instructions which, when executed by one or more processors, cause:
    terminating the first event handler prior to receiving the output corresponding to the execution of the native function call.

6. The one or more media of claim 1, wherein selecting the first event handler comprises instantiating the first event handler and selecting the second event handler comprises instantiating the second event handler.

7. The one or more media of claim 1, wherein the request further comprises a callback uniform resource locator (URL), and wherein transmitting the response comprises accessing the callback URL.

8. The one or more media of claim 1, wherein the response indicates a location where the output corresponding to the execution of the native function call is stored, the location being accessible to the requesting entity.

9. The one or more media of claim 1, wherein the response comprises the output corresponding to the execution of the native function call.

10. The one or more media of claim 1, further storing instructions which, when executed by one or more processors, cause:
    converting, before instantiating the first event handler, the request to a normalized message format associated with the first event handler.

11. The one or more media of claim 10, further storing instructions which, when executed by one or more processors, cause:
    converting, before instantiating the second event handler, the output to the normalized message format.

12. The one or more media of claim 1, further storing instructions which, when executed by one or more processors, cause:
    converting, before transmitting the response to the requesting entity, the response to a message format supported by the requesting entity.

13. The one or more media of claim 1, wherein the function identifier identifies a package of functions and a particular function in the package of functions.

14. The one or more media of claim 1, wherein selecting the first event handler is based on at least one system optimization criterion.

15. The one or more media of claim 14, wherein the at least one system optimization criterion comprises a load balancing criterion.

16. The one or more media of claim 1, wherein the service maintains a persistent connection with the requesting entity from (a) receiving the request to (b) transmitting the response.

17. The one or more media of claim 1, wherein the plurality of event handlers comprises a pre-instantiated pool of event handlers.

18. The one or more media of claim 1, wherein the service is a web service.

19. A system comprising:
    at least one device including a hardware processor;
    the system being configured to perform operations comprising:
    receiving, from a requesting entity to a service, a request comprising a function identifier and function input;
    responsive to receiving the request: selecting a first event handler, of a plurality of event handlers, to process the request;
    translating, via the first event handler, the function identifier to a native function call;
    initiating execution of the native function call using the function input;
    receiving output corresponding to the execution of the native function call;
    terminating the first event handler prior to receiving the output corresponding to the execution of the native function call, wherein the first event handler does not handle the output corresponding to the native function call;

responsive to receiving the output corresponding to the execution of the native function call:
  selecting a second event handler, of the plurality of event handlers, to process the output;
generating, at least in part by the second event handler, a response based on the output; and
transmitting the response to the requesting entity.

20. A method comprising:
receiving, from a requesting entity to a service, a request comprising a function identifier and function input;
responsive to receiving the request: selecting a first event handler, of a plurality of event handlers, to process the request;
translating, via the first event handler, the function identifier to a native function call;
initiating execution of the native function call using the function input;
receiving output corresponding to the execution of the native function call;
responsive to receiving the output corresponding to the execution of the native function call:
  selecting a second event handler, of the plurality of event handlers, to process the output;
generating, at least in part by the second event handler, a response based on the output; and
transmitting the response to the requesting entity;
wherein the method is performed by at least one device comprising a hardware processor.

* * * * *